United States Patent [19]

Morikawa

[11] Patent Number: 5,195,006
[45] Date of Patent: Mar. 16, 1993

[54] THIN-FILM MAGNETIC HEAD ELEMENT HAVING HIGH RECORDING/REPRODUCING CHARACTERISTICS

[75] Inventor: Kazutoshi Morikawa, Amagasaki, Japan

[73] Assignee: Mitsubishi Denki Kabushiki Kaisha, Japan

[21] Appl. No.: 711,154

[22] Filed: Jun. 6, 1991

[30] Foreign Application Priority Data

Jun. 7, 1990 [JP] Japan .................. 2-149244

[51] Int. Cl.$^5$ .............................. G11B 5/23
[52] U.S. Cl. ..................... 360/126; 360/119
[58] Field of Search ............ 360/126, 119, 122

[56] References Cited

FOREIGN PATENT DOCUMENTS 62-92213 4/1987 Japan .................. 360/126

OTHER PUBLICATIONS

IEEE Transactions on Magnetics, vol. 25, No. 5, Sep. 1989, pp. 3190-3193 "A New Thin Film Head Generation IC Head" by Lazzari et al.

IEEE Transactions on Magnetics, vol. 25, No. 5, Sep. 1989, pp. 3686-3688 "A New Approach to Making Thin Film Head-Slider Devices" by Chapman.

Primary Examiner—John H. Wolff
Attorney, Agent, or Firm—Wolf, Greenfield & Sacks

[57] ABSTRACT

A thin-film magnetic head element comprising, on an insulative substrate, a core made by laminating a magnetic film for the lower core and a magnetic film for the upper core provided with a head gap which forms a magnetic pole generating a recording magnetic field, and a conductive film for coil crossing with the core through an insulator, being provided with a concave void which makes the shape of the magnetic pole in the vicinity of the head gap to be concave. The depth of the head gap is made shallow and the thickness of the magnetic pole outside the vicinity of the head gap satisfactorily thick. The length of the concave void in the moving direction of a recording medium is 1 to 7 μm.

8 Claims, 3 Drawing Sheets

THIN-FILM MAGNETIC HEAD ELEMENT HAVING HIGH RECORDING/REPRODUCING CHARACTERISTICS

BACKGROUND OF THE INVENTION

1. Field of the Invention

The present invention relates to a thin-film magnetic head element used for recording/reproducing the magnetic head to a magnetic recording medium, especially to a thin-film magnetic head element which has the optimum shape of a magnetic pole in the vicinity of a head gap.

2. Description of Related Art

FIG. 1(a) is a sectional view of essential parts of the thin-film magnetic head element disclosed in IEEE TRANSACTIONS ON MAGNETICS, Vol. 25, No. 5, September 1989, p. 3190 and FIG. 1(b) is a partially enlarged view in the vicinity of a head gap (b area) shown in FIG. 1(a). In the figure, reference numeral 1 designates an insulative silicon substrate. On the substrate 1, a permalloy core 2a, obtained by laminating a magnetic film 3 for the lower core and a magnetic film 4a for the upper core, is formed. A head gap 6a which forms a magnetic pole generating a recording magnetic field at the permalloy core 2a is provided at the magnetic film 4a for the upper core. The gap length $g_L$ of this head gap 6a is, for example, 0.5 μm. A conductive film 8 as a coil is formed with crossing with the permalloy core 2a. Between the core 2a and the conductive film 8, an insulator 9 is interposed, the insulator 9 insulating the both. At the upper side of the thin-film magnetic head element, a recording medium 10 is disposed which opposes a flying surface 11 of the thin-film magnetic head element in parallel, and moves closely along the thin-film magnetic head element, being apart by a gap d (0.35 μm, for example) therefrom.

Next, explanation will be given on the operation. The thin-film magnetic head is used after being opposed to the recording medium 10 in parallel and moved upward by a gap d. In recording information, information is recorded by flowing current to the conductive film 8 corresponding to the information and magnetizing the recording medium 10 due a to leakage magnetic field generated in the vicinity of the head gap 6a of the magnetic film 4a for the upper core. On the other hand, information is reproduced by moving the magnetized recording medium 10, dividing the magnetic flux of the surface of the recording medium 10 to the magnetic paths of the core 2a, thereby inducing voltage corresponding to the rate of change of the magnetic flux.

In the thin-film magnetic head element as above-mentioned, there is a problem that it is difficult to obtain a recording magnetic field required at a time of recording when trying to make the depth $g_D$ of the head gap 6a shallow in order that reproducing efficiency may be heightened by using much effective magnetic flux crossing the conductive film 8 as a coil among the whole magnetic flux transmitted to the core 2a.

SUMMARY OF THE INVENTION

The primary object of the invention is to provide a thin-film magnetic head element capable of optimizing a shape of the magnetic pole in the vicinity of a head gap.

Another object of the invention is to provide a thin-film magnetic head element which is capable of improving reproducing efficiency as well as obtaining a recording magnetic field required at a time of recording.

Further object of the invention is to provide a thin-film magnetic head element which has a satisfactory recording/reproducing characteristic.

The thin-film magnetic head element of the present invention, comprising a core made by laminating a magnetic film for the lower core and a magnetic film for the upper core being provided with a head gap forming a magnetic pole which generates a recording magnetic field, and a conductive film for coil crossing with the above mentioned core through an insulator, is provided with a concave void so that the shape of the magnetic pole in the vicinity of the head gap is made to be concave at the surface of the substrate side of the magnetic film for the upper core. The length of the concave void in the moving direction of the recording medium is 1 to 7 μm. In this way, the depth of the head gap can be made shallow and the thickness of the magnetic pole outside of the vicinity of the head gap can be made satisfactorily thick. As a result, the reproducing efficiency being a ratio of the effective magnetic flux which flows the core to the whole magnetic flux and the recording magnetic field required for recording are optimized.

The above and further objects and features of the invention will more fully be apparent from the following detailed description with accompanying drawings.

DESCRIPTION OF THE PREFERRED EMBODIMENTS

Figure 1:
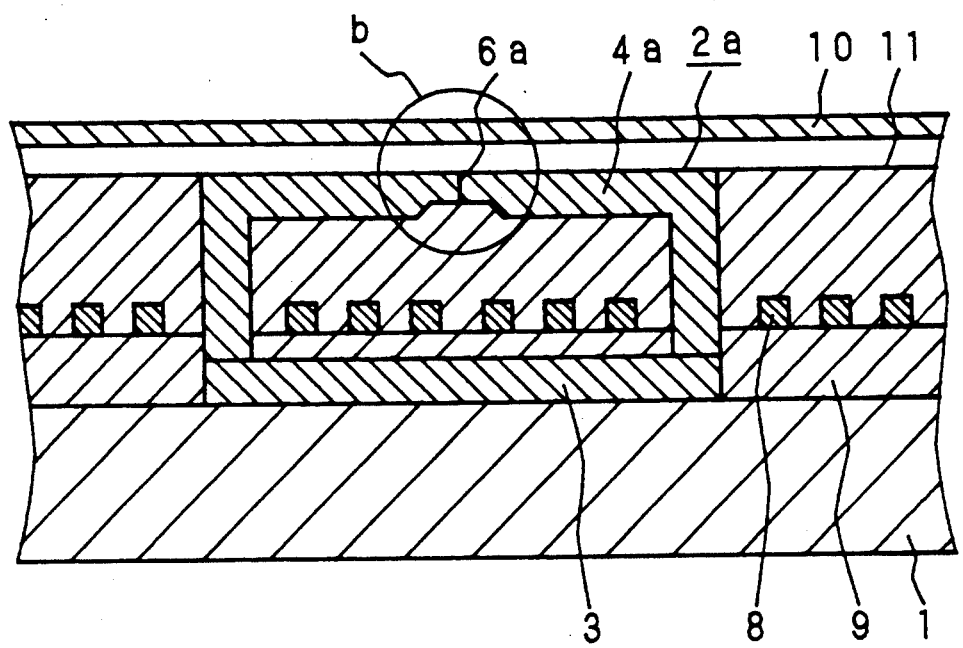
FIG. 1(a) is a sectional view showing essential parts of a conventional thin-film magnetic head element.
FIG. 1(b) is a partially enlarged view of the vicinity of the head gap shown in FIG. 1(a).
Figure 1:
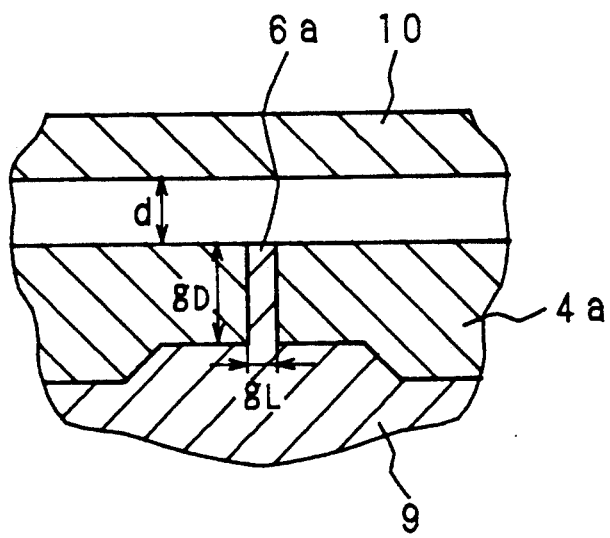
Figure 2A:
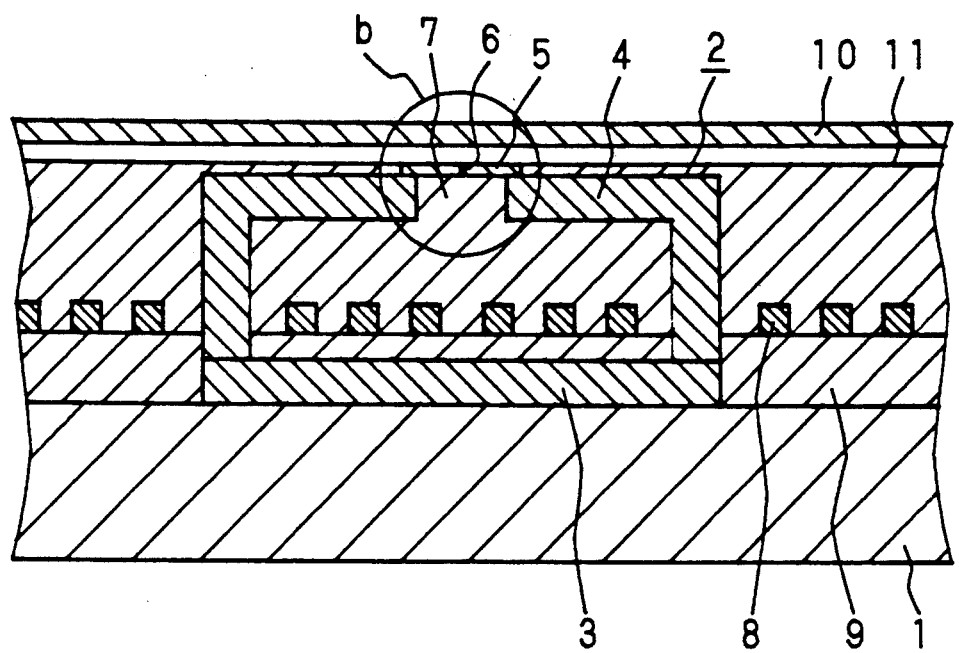
FIG. 2(a) is a sectional view showing essential parts of a thin-film magnetic head element related to the invention.
Figure 2B:
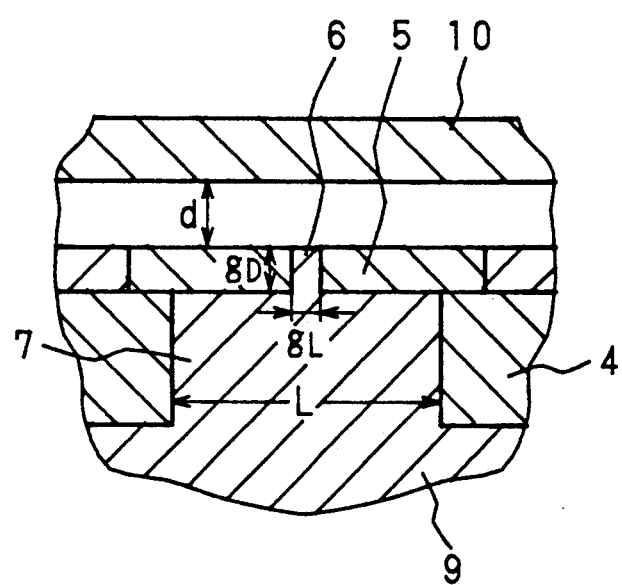
FIG. 2(b) is a partially enlarged view of the vicinity of the head gap shown in FIG. 2(a).

FIG. 2(a) is a sectional view of essential parts of a thin-film magnetic head element and FIG. 2(b) is a partially enlarged view of the vicinity of a head gap (b area) in FIG. 2(a). In the figure, portions of the same numbers as in FIG. 1(a), (b) show the same portions. Reference numeral 1 designates an insulative silicon substrate. On the substrate 1, a core 2, made by laminating a magnetic film 3 for the lower core and magnetic film 4 and 5 for the upper core, is formed. A head gap 6 forming a magnetic pole which generates a recording magnetic field at the core 2 is provided at the upper magnetic film 5 for the upper core. The length $g_L$ of the head gap 6 is 0.3 μm, for example. At the lower magnetic film 4 for the upper core, a concave void 7 is provided so that a shape of magnetic pole in the vicinity of the head gap 6 is made to be concave. The length L of the concave void 7 in the moving direction of a recording medium 10 is 1 to 7 μm. A conductive film 8 as a coil is formed in the state of crossing with the core 2. An insulator 9 is interposed between the core 2a and the conductive film 8, insulating the both. At the upper side of the thin-film magnetic head element having the construction as above, a recording medium 10 is disposed which opposes a flying surface 11 of the thin-film magnetic head element in parallel, and moves closely along the thin-film magnetic head element, being apart by a gap d (0.35 μm, for example) therefrom.

Next, explanation will be given on operation. Explanation of recording and reproducing operations is omitted, as the operations are basically the same as those of the conventional example. Here, explanation will be given on operation accompanying the formation of the concave void 7 being characteristic of the invention.

Figure 3:
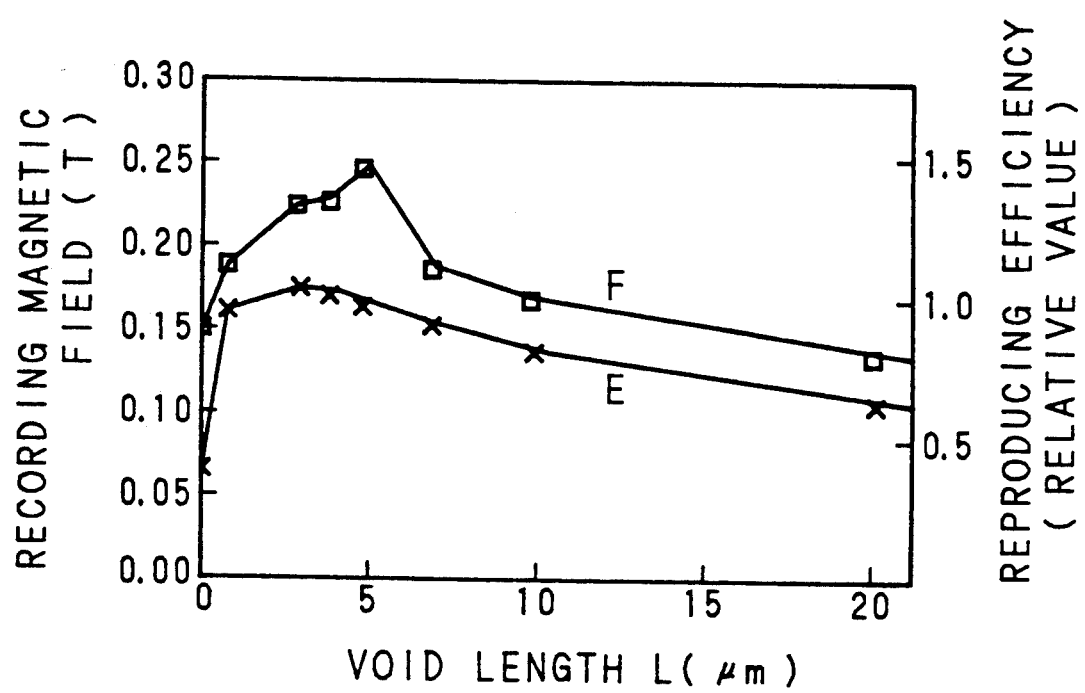
FIG. 3 is a graph showing a simulation result of recording magnetic field and reproducing efficiency to the length of the concave void.

FIG. 3 shows a simulation result of the recording magnetic field to the length L of the concave void 7 (F in the figure) and the reproducing efficiency to that (E in the fugure), by a calculating machine due to FEM (Finite Element Method). As understood from the graph in FIG. 3, the length L of the concave void 7 should be set at the range of 1 to 7 μm in order to optimize both the recording magnetic field and reproducing efficiency.

Accordingly, in the present invention, the concave void 7 is provided in the vicinity of the head gap 6 and the length L of the concave void is set at the range of 1 to 7 μm. Thereby, the depth $g_D$ of the head gap 6 can be made shallow and the thickness of the magnetic pole outside the vicinity of the head gap 6 can be made satisfactorily thick, and reproducing efficiency can be heightened because of much effective magnetic flux among the whole magnetic flux transmitted to the core 2 as well as the recording magnetic field required for recording can be obtained. As a result, according to the present invention, it is possible to provide a thin-film magnetic head element having a satisfactory recording-/reproducing characteristic.

In addition, in the embodiment above-mentioned, although the magnetic film for the upper core is formed of a double-layer of the lower magnetic film 4 and upper magnetic film 5, it will be all right for the magnetic film for the upper core to be more of any-layer if it has the construction to have the concave void 7 at the upper core so that the shape of the magnetic pole in the vicinity of the head gap 6 is concave. In the case where the magnetic film for the upper core is formed as of plural-layer, the area of the facing surface to the magnetic pole exposing at the flying surface 11 can be made small, thereby there is such an effect that abrasion resistance to the recording medium 10 can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A thin-film magnetic head element which generates a magnetic pole for detecting the surface flux of a moving recording medium after being magnetized comprising:
   an insulative substrate;
   a core having a first magnetic film formed on said insulative substrate and a second magnetic film laminated on said first magnetic film and having means defining a head gap for forming a magnetic pole for generating a recording magnetic field; and
   a conductive film forming a coil crossing with said core through an insulator;
   said second magnetic film further having means defining a void with a substantially rectangular-shaped cross section contiguous with said head gap so that the shape of the magnetic pole in the vicinity of said head gap is made concave at the surface of said insulative substrate side of said second magnetic film.

2. A thin-film magnetic head element as set forth in claim 1, wherein the length of said void in the moving direction of said recording medium is 1 to 7 μm.

3. A thin-film magnetic head element as set forth in claim 1, wherein said second magnetic film has laminated plural magnetic layers.

4. A thin-film magnetic head element as set forth in claim 3, wherein said second magnetic film has laminated double layers.

5. A thin-film magnetic head element as set forth in claim 4, wherein said head gap is provided at one of said double magnetic layers, and said void at the other magnetic layer.

6. A thin-film magnetic head element for detecting the surface flux of a moving recording medium after magnetization, comprising:
   a substrate;
   a core having a first magnetic film formed on the substrate and a second magnetic film, comprising at least one film layer, laminated on the first magnetic film;
   said second magnetic film having means defining a head gap for forming a magnetic pole for generating a recording magnetic field;
   said second magnetic film further having means defining a void contiguous with said head gap, and said void having a length greater than the length of the head gap;
   an insulator; and
   a conductive film for coil crossing with said core through said insulator.

7. A thin film magnetic head element for detecting the surface flux of a moving recording medium after magnetization, comprising:
   a substrate;
   a core comprising first, second and third magnetic films;
   said first magnetic film formed on said substrate;
   said second magnetic film laminated on said first magnetic film and having means defining a void; and
   said third magnetic film laminated on said second magnetic film and having means defining a head gap for forming, with said void, a magnetic pole for generating a recording magnetic field.

8. A thin-film magnetic head element for detecting the surface flux of a moving recording medium after magnetization, comprising:
   a substrate;
   a core having a first magnetic film formed on the substrate and a second magnetic film, comprising at least one film layer, laminated on the first magnetic film;
   said second magnetic film having means defining a head gap for forming a magnetic pole for generating a recording magnetic field;
   said second magnetic film further having means defining a void contiguous with said head gap, and said void having a depth greater than the depth of the head gap.

* * * * *